UNITED STATES PATENT OFFICE.

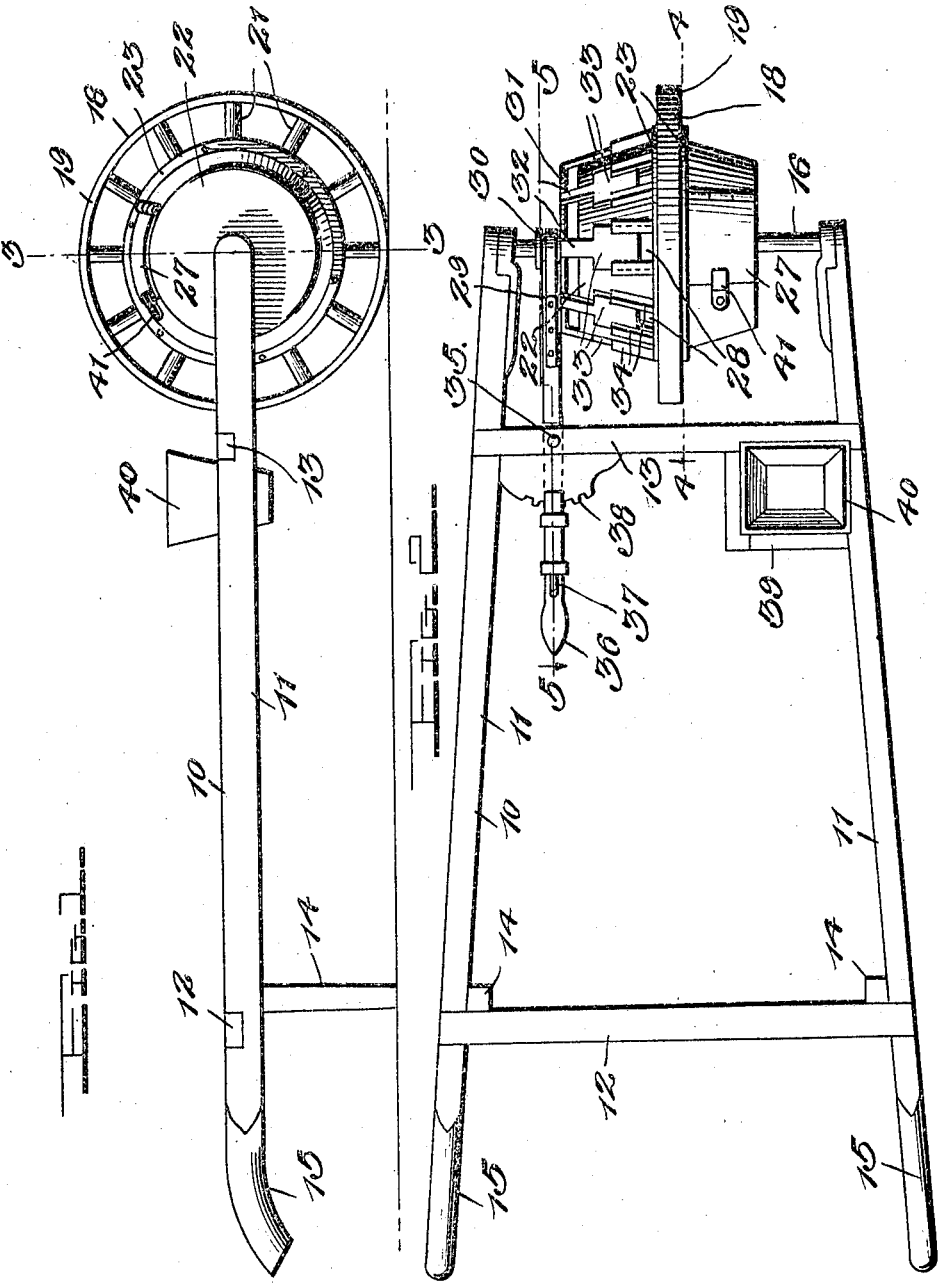

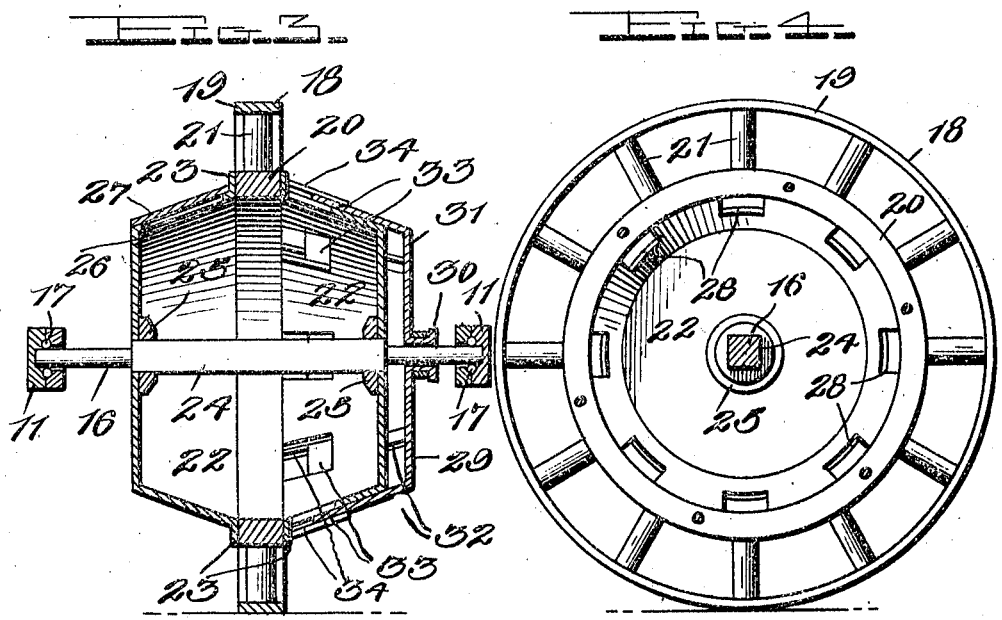
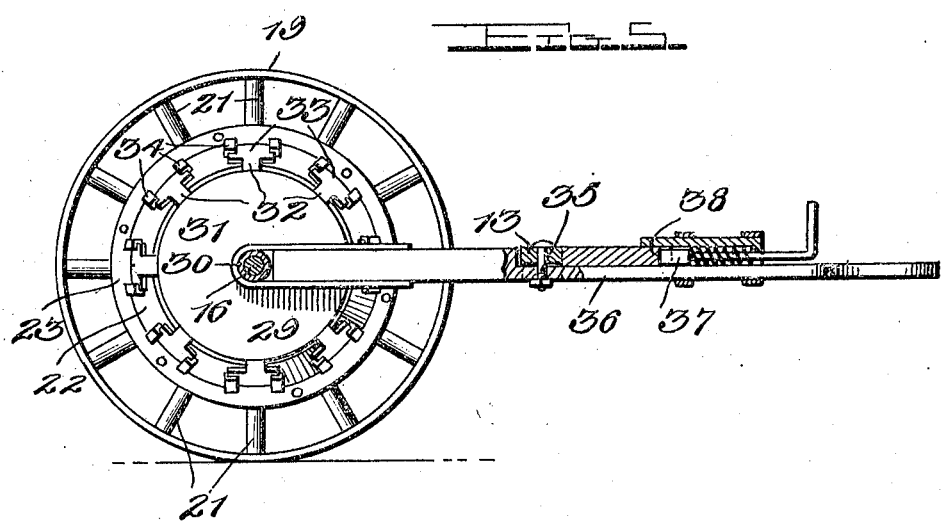

SCOTT NATHERS MILLS, OF HOPE, ARKANSAS.

FERTILIZER-DISTRIBUTER.

1,055,347.  Specification of Letters Patent.  Patented Mar. 11, 1913.

Application filed July 8, 1912. Serial No. 708,303.

*To all whom it may concern:*

Be it known that I, SCOTT NATHERS MILLS, a citizen of the United States, residing at Hope, in the county of Hempstead and State of Arkansas, have invented certain new and useful Improvements in Fertilizer-Distributers, of which the following is a specification, reference being had to the accompanying drawings.

This invention relates to an improvement in fertilizer distributers and more particularly to a rotary distributer which can be manually propelled and operated by a single person.

This invention has for its primary object to construct a device of the aforesaid character with a supporting wheel which is provided with a distributing receptacle for distributing the fertilizer.

A further object of the present invention is to provide a fertilizer distributer of the class before described with a valve operating means which will control the flow of fertilizer from the receptacle and which may also be used for entirely cutting off the flow of fertilizer when the device is not in use.

Further objects will appear hereinafter as the description continues.

With the above and other objects in view, this invention consists of the novel details of construction, combination, formation and arrangement of parts as will be hereinafter more fully described and particularly pointed out in the appended drawings, in which—

Figure 1 is a side elevation embodying my invention. Fig. 2 is a top plan view of the same. Fig. 3 is a transverse section taken through the fertilizer hopper and distributer taken on the line 3—3 of Fig. 1. Fig. 4 is a section through the supporting wheel having one section of the receptacle removed, taken on the line 4—4 of Fig. 2, and Fig. 5 is a longitudinal section taken on the line 5—5 of Fig. 2.

Reference now being had to the accompanying drawings wherein I have illustrated corresponding parts by like numerals throughout the several views, the numeral 10 indicates a supporting frame which comprises a pair of converging side members 11 being connected by transverse bars adjacent each end thereof, indicated by the numerals 12 and 13, respectively. The transverse bar 12 has depending therefrom a pair of supports 14 which provide suitable means for supporting one end of the frame when the same is not in use or in a lowered position. Extending from the side members 11 are a pair of handles 15 by which the operator may propel the device over the field. The opposite extremities of the converging side members 11 are connected by a transversely extending shaft or axle 16 which is journaled within suitable antifrictional ball bearings 17 mounted within each of the side members. Mounted to turn with this shaft 16 is a ground or supporting wheel 18 in which is mounted a fertilizer compartment and distributer. This supporting wheel comprises an outer rim 19 and an inner rim 20 which are connected by radially extending spokes 21. This ground wheel 18 is supported upon the shaft by the fertilizer holding receptacle. This receptacle comprises a pair of truncated conical sections 22 which are made of zinc or any other suitable sheet metal and are provided with annular flanges 23 which are bolted or otherwise secured to the inner rim 20 of the ground supporting wheel.

The central portion of the shaft 16 is squared, as at 24, and has mounted thereon the sections 22 of the fertilizer compartment by means of blocks 25. One of the sections 22 of the fertilizer holding compartment is provided with an opening 26 for receiving the fertilizer, and this section is also provided with a closure 27 for closing the opening 26 to prevent the escape of any of the fertilizer during the rotation of the ground wheel. The opposite section 22 of the fertilizer holding compartment is provided with a plurality of spaced openings 28 through which the fertilizer is dropped when the device is being propelled over the field. To provide means for regulating the flow of fertilizer through these openings 28 and also to cut off the supply of fertilizer when the device is not in use or when turning from one row to another, I provide the member 29 which comprises a cylindrical sleeve 30 slidably mounted upon the shaft 16 and having formed integral therewith a disk 31. This disk 31 has extending therefrom a plurality of radially extending spring arms 32 which are each provided at their extremities with a valve plate 33 for regulating the flow of the fertilizer through the openings 28. Each of these valves 33 are slidably mounted within guideways 34 mounted upon the periphery of the section of the compartment adjacent the openings 28.

Pivotally secured, as at 35, to the transverse member 13 of the supporting frame is a lever 36. One end of this lever is provided with a bearing which is loosely mounted upon the sleeve 30 of the valve operating mechanism, whereas, its opposite end is provided with a spring actuated pawl 37 adapted to engage a segmental rack 38 mounted upon the transverse member 13. It is apparent from this construction, that the valve operating mechanism may be so operated to control the flow of fertilizer through the openings 28 and also is adapted to hold the valve in either a closed or opened position.

Mounted between one of the side rails 11 and the transverse bar 13 is an auxiliary frame 39 in which is adapted to rest a funnel 40. This funnel is adapted to be inserted within the opening 26 formed within the fertilizer holder compartment to facilitate the pouring of the fertilizer within the compartment, but after the compartment has been filled with fertilizer, the door 27 may be closed and held in a closed position by means of a catch 41, and the funnel 40 is then placed within the frame 39 until it is to be used again.

It is obvious from the foregoing description, taken in connection with the accompanying drawings, that I have constructed a fertilizer distributer which will be simple in operation, strong, durable and efficient when in use, and which will also greatly reduce the present cost of manufacture of such devices. It is further apparent that this device may be operated or propelled over the field by one person.

Having thus described my invention, what I claim is:

1. In a fertilizer distributer, the combination with a frame, of an axle journaled therein, a pair of truncated conical sections carried by said axle, a wheel connected to the inner marginal edges of said sections, one of said sections having an opening therein and a hingedly mounted closure plate adapted to close said opening, the other section having an annular series of openings therein, a disk slidably mounted upon said axle, a plurality of laterally extending arms carried by said disk, valve plates carried by said arms, guideways mounted upon the periphery of said other section adjacent the openings therein, said valve plates being slidably mounted in said guideways and adapted to close the openings formed within said section, and means pivotally connected to said frame for holding the valve plates in adjusted position with relation to the openings.

2. In a fertilizer distributer, the combination with a frame, of an axle journaled therein, a wheel mounted on said axle comprising an inner and outer rim, a pair of truncated conical sections carried by said axle, annular flanges formed on the inner marginal edges of said sections, means for connecting said annular flanges to said inner rim, one of said sections having a closure controlled opening formed therein, the other section having an annular series of openings formed within the marginal edge thereof, a disk slidably mounted upon said axle, a sleeve connected to said disk and engaging said axle, a plurality of laterally extending arms integrally connected to said disk, laterally extending valve plates formed integrally with said arms, guideways mounted upon the periphery of said other section adjacent the openings formed therein, said valve plates being operatively mounted within said guideways and adapted to close the openings formed within said section, a lever pivotally mounted intermediate of its ends in said frame, one end of said lever being connected to said sleeve and means connected to the other end of said lever for holding said lever in adjusted position, substantially as described.

In testimony whereof I hereunto affix my signature in the presence of two witnesses.

SCOTT NATHERS MILLS.

Witnesses:
L. D. REW,
S. J. GENTRY.